(12) United States Patent
Hwang et al.

(10) Patent No.: US 7,840,351 B2
(45) Date of Patent: Nov. 23, 2010

(54) METHOD FOR CORRECTING IONOSPHERE ERROR, AND SYSTEM AND METHOD FOR DETERMINING PRECISION ORBIT USING THE SAME

(75) Inventors: Yoo-La Hwang, Daejeon (KR); Byoung-Sun Lee, Daejeon (KR); Jae-Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 866 days.

(21) Appl. No.: 11/718,234

(22) PCT Filed: Nov. 4, 2005

(86) PCT No.: PCT/KR2005/003710

§ 371 (c)(1),
(2), (4) Date: Apr. 28, 2007

(87) PCT Pub. No.: WO2006/049450

PCT Pub. Date: May 11, 2006

(65) Prior Publication Data

US 2009/0091493 A1    Apr. 9, 2009

(30) Foreign Application Priority Data

Nov. 4, 2004    (KR) .................... 10-2004-0089458

(51) Int. Cl.
*G01C 21/00* (2006.01)
(52) U.S. Cl. ...................................... 701/213
(58) Field of Classification Search .................. 701/13, 701/213, 226; 342/357.15, 357.16, 358
See application file for complete search history.

(56) References Cited

U.S. PATENT DOCUMENTS

| 5,724,046 | A | 3/1998 | Martin et al. |
| 5,796,773 | A | 8/1998 | Sheybalt |
| 6,683,563 | B2 | 1/2004 | Lee et al. |
| 2005/0146461 | A1* | 7/2005 | Pande et al. ............ 342/357.02 |

FOREIGN PATENT DOCUMENTS

| KR | 1020030042543 A | 6/2003 |
| KR | 1020040058808 A | 7/2004 |

OTHER PUBLICATIONS

Hwang, Y., "Orbit Determination Strategy Using Single Frequency GPS Data," thesis submitted to University of Colorado, Department of Aerospace Engineering Sciences (Dec. 2003).
Yoon, J.C., "Orbit Determination of Spacecraft Using Global Positioning System Single-Frequency Measurement," J. Spacecr. Rockets, 39(5):796-801 (Sep.-Oct. 2002).

* cited by examiner

*Primary Examiner*—Kim T Nguyen

(57) ABSTRACT

Provided is a method of correcting an ionosphere error, a system of a precise orbit determination using the same and a method thereof. The method includes the steps of: a) determining a time of a highest elevation angle of a GPS satellite per one pass of each GPS satellite received at a LEO satellite or a receiver on a ground; b) determining a minimum total electron content found from an ionosphere model of the determined time per one pass of each GPS satellite; c) determining a total electron content directly calculated from the LEO satellite or a single frequency GPS data; d) determining an ionosphere error value of a single frequency GPS data by combining the minimum total electron content and the directly calculated total electron content; and e) correcting pseudorange data or carrier phase data based on the determined ionosphere error value.

7 Claims, 4 Drawing Sheets

METHOD FOR CORRECTING IONOSPHERE ERROR, AND SYSTEM AND METHOD FOR DETERMINING PRECISION ORBIT USING THE SAME

TECHNICAL FIELD

The present invention relates to a method for correcting an ionosphere error, and a system and a method for precisely determining an orbit using the same; and more particular, to a method for correcting an ionosphere error caused by using a single frequency, a system for precisely determining an orbit using observation data measured through the ionosphere error correcting method, and a method thereof.

BACKGROUND ART

A global positioning system (GPS) has been used in various fields such as a geodetic survey, a survey, a scientific observation and a time synchronization. A GPS signal has a 1575.42 MHz of L1 frequency and a 1227.6 MHz of L2 frequency. Such a GPS signal is delayed while passing the atmosphere due to an ionosphere error, a troposphere error, and a multipath error. These errors degrade the accuracy to determine an orbit in a navigation system or a precise geodetic survey. After releasing a S.A. effect at May 2005, it is possible to eliminate the ionosphere delay that is a main error factor.

The precise observation data can be received using the dual frequency GPS receiver. However, a single frequency is generally used for economic reason or when the dual frequency is not available. There are two representative methods of reducing the ionosphere error due to the single frequency. That is, these are a method of using directly observed data values and another method of using an ionosphere model.

The method of using the ionosphere model produces large error values when the elevation angle of GPS satellite is lowered. The method of using the ionosphere model generally produces inaccurate data compared to the method of using the observed data values. Such an inaccurate observation data degrades the accuracy of an orbit.

There are two methods in the method of using the observed data, which are a graphic method and a DRVID method.

The GRAPHIC method generates new data by averaging a pseudorange and carrier phase of the observation epoch. That is, an integer ambiguity must be precisely calculated to use for orbit determination. On the contrary, the DRVID method corrects ionosphere error in carrier phase or pseudorange of original data. The DRVID method must calculate two average data of pseudorange and carrier phase at two times, and calculated a difference of two average data. Herein, the DRVID method does not need to calculate an integer ambiguity when the signal is locked since the integer ambiguity is identical per each pass of the signal while the signal is locked. Inaccurate integer ambiguity degrades the precision of the observed data, and estimation of integer ambiguity is very annoying process in software view. On the contrary, the DRVID method must recognize ionosphere error value in a time of the shortest distance of a signal per pass, that is, when the elevation angle is highest. Also, the DRVID method must estimate a bias value per one pass to know the ionosphere error at a time of the highest elevation angle while determining a precise orbit.

DISCLOSURE

Technical Problem

It is, therefore, an object of the present invention to provide a method of correcting an ionosphere error by combining an ionosphere error directly calculated from observation data and other ionosphere error calculated using a typical ionosphere model.

It is another object of the present invention to provide a system for a precise orbit determination by adapting a filtering theory using dual frequency GPS data received at GPS observation stations, GPS precise orbit ephemeris and raw data received at a GPS receiver embedded in an on-board of a Low-Earth-Orbit (herein after, described as LEO) satellite, and a method thereof.

Technical Solution

In accordance with one aspect of the present invention, there is provided a system for a precise orbit determination including: an initial orbit determination unit for estimating an initial position of a GPS satellite based on a GPS ephemeris provided from a GPS observation station and determining a position of a LEO satellite based on navigation data of a LEO satellite; an ionosphere error calculating and correcting unit for correcting an ionosphere error by calculating a first total electron content based on combination of carrier phase and pseudorange data in a L1 single frequency GPS data and a distance difference in time, finding a second total electron content from an ionosphere model, adding the first and the second total electron contents, and correcting a L1 single frequency GPS original raw data; a preprocessing unit for double differencing GPS data received at a GPS observation station and a GPS data received at a LEO satellite to generate an ionosphere error removed observation data; and an orbit determination unit for determining an orbit by applying a GPS observation model in an ionosphere error removed observation data and estimating a position and a velocity through performing a filter algorithm on a difference from an observation modeling and a difference from a dynamic perturbation model.

In accordance with another aspect of the present invention, there is provided a method of correcting an ionosphere error including: a) determining a time of a highest elevation angle of a GPS satellite per one pass of each GPS satellite received at a LEO satellite or a receiver on a ground; b) determining a minimum total electron content of the determined time from an ionosphere model; c) determining a total electron content directly calculated from the LEO satellite or a single frequency GPS data; d) determining an ionosphere error value of a single frequency GPS raw data by combining the minimum total electron content and the directly calculated total electron content; and e) correcting pseudorange data or carrier phase data based on the determined ionosphere error value.

In accordance with still another aspect of the present invention, there is provided a method of a precise orbit determination using a method of correcting an ionosphere error, the method including the steps of: a) estimating an initial position of a GPS satellite based on a GPS ephemeris provided from a GPS observation station and determining a position of a LEO satellite based on navigation data of a LEO satellite; b) correcting an ionosphere error by calculating a first total electron content based on combination of carrier phase and pseudorange data in a L1 single frequency GPS data and a distance difference in time, finding a second total electron content from an ionosphere model, adding the first and the second total electron contents, and correcting a L1 single frequency GPS original data; c) double differencing GPS data received at a GPS observation station and a GPS data received at a LEO satellite to generate an ionosphere error removed observation data; and d) determining an orbit by applying a GPS observation model in an ionosphere error removed observation data and estimating a position and a velocity through performing a filter algorithm on a difference from an observation modeling and a difference from a dynamic perturbation model.

ADVANTAGEOUS EFFECTS

According to the present invention, ionosphere errors in observation data can be effectively eliminated, and an orbit can be precisely determined using the ionosphere errors eliminated observation data. Therefore, the present invention can be applied to precise geodetic survey and a navigation system using a single frequency.

Although average data of carrier phase data and pseudorange data is used to obtain precise ionosphere error, an orbit is accurately determined and a geodetic survey is precisely performed without calculating an integer ambiguity according to the present invention because a distance difference between averaged observation data at every observation time, and it can be calculated in high speed with less data capacity even in an on-board system.

By directly correcting ionosphere error in carrier phase data, it is possible to use precisely calculated observation data and noise free carrier phase data. Accordingly, the orbit is more accurately determined and the geodetic survey is more precisely performed by L1 carrier phase correction compared to a geodetic survey and an orbit determination using pseudorange with dual frequency. Furthermore, the ionosphere error can be eliminated without modifying source codes related to precise geodetic survey and to precise orbit determination.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth herein after.

Figure 1:
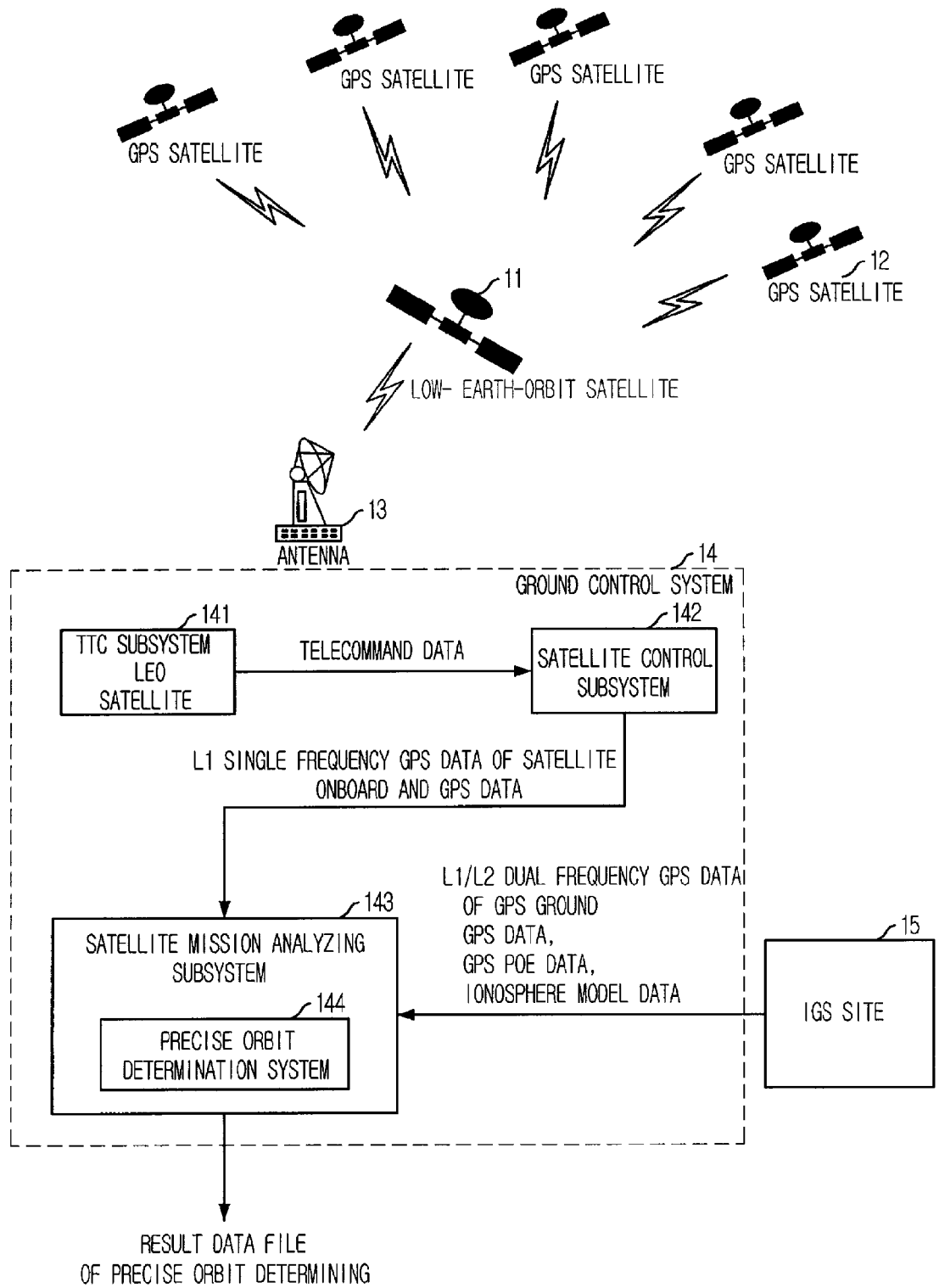
FIG. 1 is a block diagram illustrating a ground control system of LEO satellites where the present invention is applied.

FIG. 1 is a block diagram illustrating a control system of LEO satellites where the present invention is applied.

As shown in FIG. 1, the ground control system includes: a LEO satellite 11 receiving GPS data from a plurality of GPS satellites 12; GPS observation stations (not shown) distributed world-widely; an IGS site 15 for gathering data from the GPS observation stations and determining a precise ephemeris of GPS satellite; and a control system 14 for monitoring states of LEO satellite 11 and controlling the LEO satellite 11 by collecting and transmitting remote measuring data from/to the LEO satellite 11 through an antenna 13.

Hereinafter, operation of the control system will be described.

The GPS data received at an on-board of a LEO satellite is transmitted from the satellite to the ground through the remote measuring data. The remote measuring data is transmitted through a TTC subsystem 141 to a satellite operations subsystem 142 that manages operations related to commands and states of the satellite. The satellite operations subsystem 142 extracts a L1 single frequency GPS data from the received remote measuring data and transmits the extracted L1 single frequency GPS data to a satellite analyzing subsystem 143.

Then, the satellite analyzing subsystem 143 analyzes L1/L2 dual frequency GPS data received at GPS satellite observation stations which is downloaded from the IGS site 15, GPS satellite precise ephemeris, the GPS data received at the on-board of the LEO satellite and an ionosphere model data and transmits the analysis result to the precise orbit determination system 144 to precisely determine an orbit of a satellite.

Figure 2:
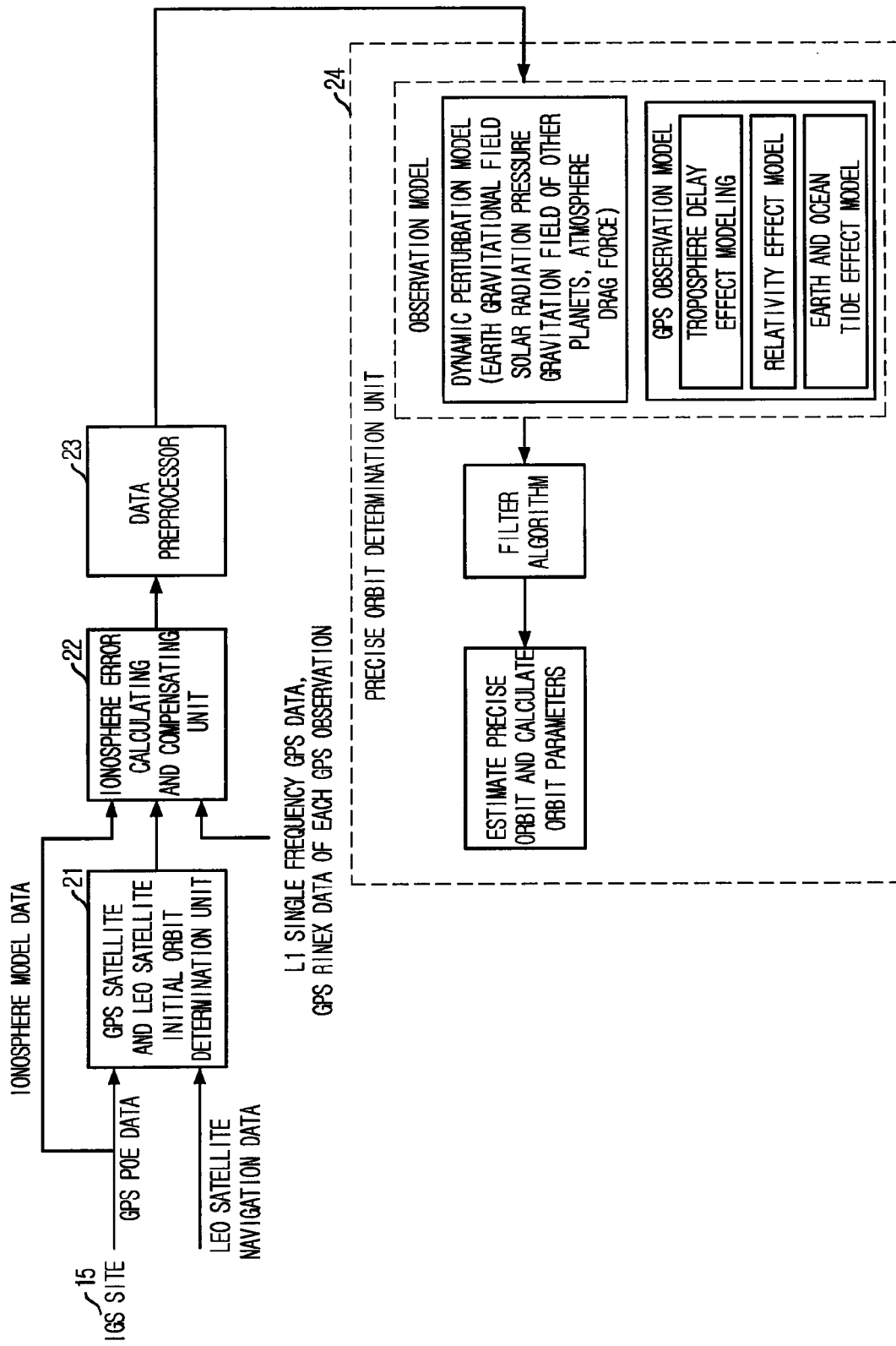
FIG. 2 is a block diagram illustrating a precise orbit determination system in accordance with a preferred embodiment of the present invention.

FIG. 2 is a block diagram illustrating a precise orbit determination system in accordance with a preferred embodiment of the present invention. That is, a step of a precise orbit determination by using an ionosphere error calculating and correcting unit 22 that uses a method of correcting ionosphere error in is shown in FIG. 2.

As shown in FIG. 2, the precise orbit determination system 144 includes an initial orbit determination unit 21 for estimating a GPS satellite and LEO satellite initial position of a GPS satellite based on GPS precise ephemeris proved from a GPS observation station and determining a position of a LEO satellite based on LEO satellite navigation data; an ionosphere error calculating and correcting unit 22 for correcting an ionosphere error by summing a minimum total electron content calculated using a combination of carrier phase and pseudorange in L1 single frequency GPS data and a distance difference in time and another minimum total electron content found in an ionosphere model, and correcting the L1 single frequency GPS original data based on the sum; an observation data preprocessor 23 for obtaining doubly differenced observation data based on the GPS data received at GPS observation stations and the error eliminated GPS data; and a precise orbit determination unit 24 for precisely determining an orbit by adapting the GPS observation model into the ionosphere error corrected observation data and estimating a position and a velocity through performing a filtering algorithm on the error of the observation model and a difference between a dynamic perturbation model and the observation model.

Hereinafter, operations of the precise orbit determination system in accordance with a preferred embodiment of the present invention will be described in detail.

The GPS satellite and LEO satellite initial orbit determination unit 21 receives a GPS precise ephemeris, that is, GPS POE data, from the IGS site 15 and sets a dynamic perturbation model of the GPS satellite, estimates an initial position of the GPS satellite through performing the filtering algorithm based on the GPS POE data and determines a position of a LEO satellite as an initial value and a dynamic model of a LEO satellite using navigation data obtained through a LEO satellite. That is, the GPS satellite and LEO initial orbit determination unit 21 requires L1/L2 dual frequency GPS data collected at the IGS site 15, the precise ephemeris of the GPS satellite and the L1 single frequency GPS data received at the user GPS receiver.

Then, the ionosphere error calculating and correcting unit 22 eliminates the ionosphere error from the dual frequency data received at the GPS observation stations. However, the GPS single frequency data received by a user has an ionosphere error. In order to remove the ionosphere error from the user received single frequency data, the total electron content is obtained in the present embodiment by using both of a method using GPS observation raw data and other method using an ionosphere model. That is, the method using the GPS observation raw data obtains the total electron content based on carrier phase and pseudorange data in the L1 frequency GPS data received at the user receiver. And, the method using a model obtains the total electron content using an ionosphere model. The ionosphere error value is calculated based on the two total electron content and the L1 frequency GPS original data is corrected based on the calculated ionosphere error value according to the present invention.

The observation data preprocessor 23 obtains double differenced observation data using the L1/L2 dual frequency GPS data received at the GPS observation station, that is, a GPS RINEX data, and the corrected GPS RINEX data of the LEO satellite, and processes the double differenced observation data to edit bad data.

In order to determine a precise orbit, a GPS observation model is required. The GPS observation model is created based on orbit components estimated using the dynamic perturbation model that is created by precisely considering a gravitational field of the earth, a solar radiation pressure and gravitation fields of other planets. Also, the ionosphere error corrected and preprocessed observation data are processed through a tropospheric delay effect modeling, a relativistic effect modeling and an Earth and Ocean Tide effect modeling to create the GPS observation model.

Then, differences from the GPS observation model and other difference from the dynamic perturbation model are processed through the filtering algorithm 20 to estimate parameters such as a position and a velocity. After the estimating, the precise orbit estimating and the orbit component calculation are performed based on the estimated parameters such as the position and a velocity.

Figure 3:
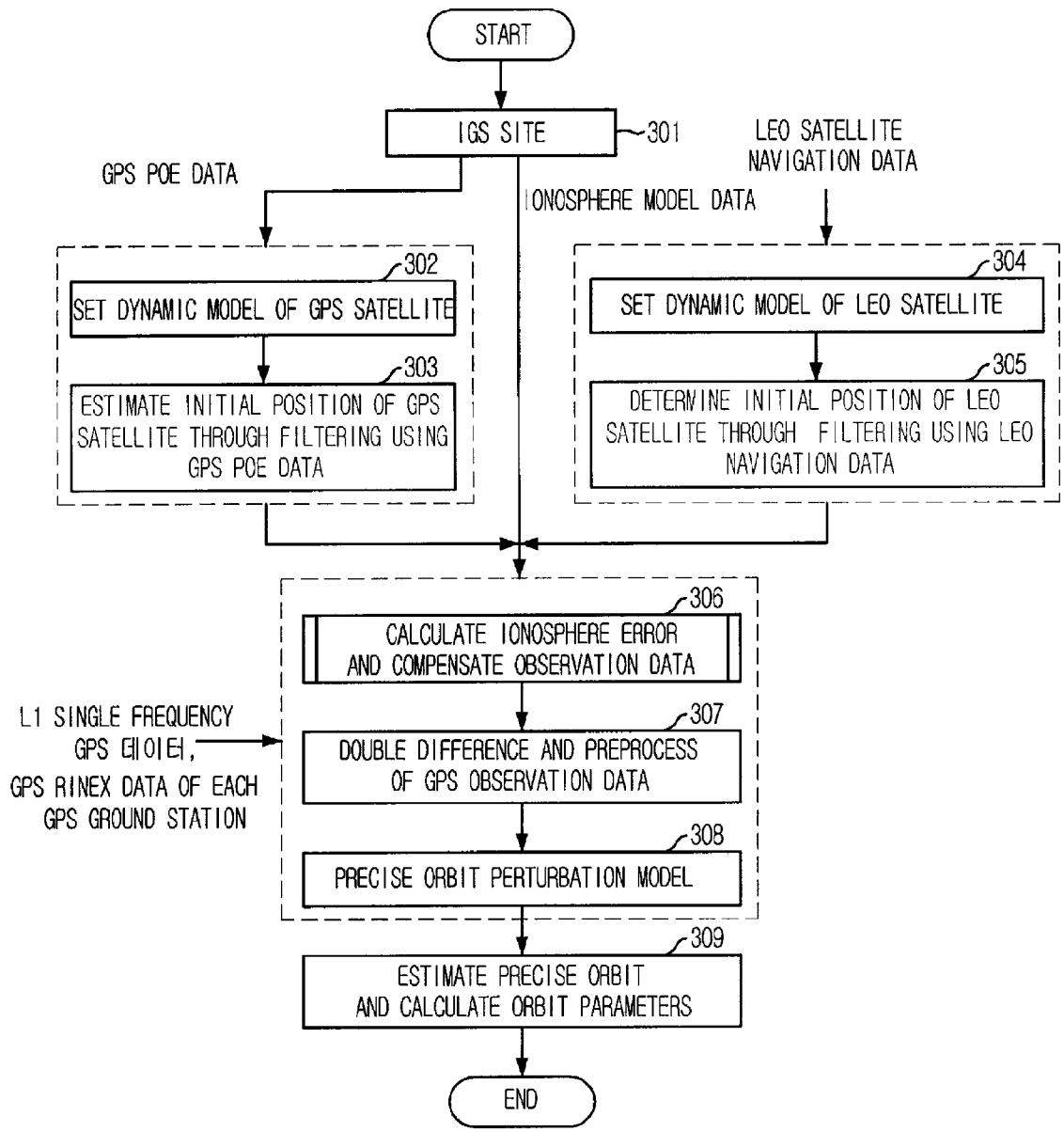
FIG. 3 is a flowchart of a method of an precise orbit determination using a method of correcting an ionosphere error in accordance with a preferred embodiment of the present invention.

FIG. 3 is a flowchart of a precise orbit determination using a method of correcting an ionosphere error in accordance with a preferred embodiment of the present invention.

As shown in FIG. 3, the GPS satellite and LEO satellite initial orbit determination unit 21 receives the L1/L2 dual frequency GPS data, that is, GPS RINEX data, received at the GPS observation station, the GPS precise ephemeris, the GPS POE data from the IGS site 301 and generates the dynamic perturbation model of the GPS satellite at step S302, and an initial position of the GPS satellite is estimated by performing the filtering algorithm on the GPS POE data at step S303. Then, a coarse dynamic model of a LEO satellite is generated by using navigation data of the LEO satellite at step S304 and a position of the LEO satellite is determined through the filtering at step S305.

Then, the determined initial values of the GPS satellite and the LEO satellite are set as "a priori" values, the ionosphere error of the L1 single frequency GPS data received at the LEO satellite is calculated and the observation data is compensated at step S306 for precisely tracing a position of a LEO satellite.

The step 306 for calculating ionosphere error and compensation the observation data will be described in detail with reference to FIG. 4 in later.

Then, the data preprocessing is performed at step S307, the precise orbit perturbation model is adapted at step S308, and the orbit of the LEO satellite is determined with several cm level of precise by repeatedly performing the filtering until the orbit components of satellite are determined.

Hereinafter, the step S306 for calculating ionosphere error and compensation the observation data will be described in detail.

Figure 4:
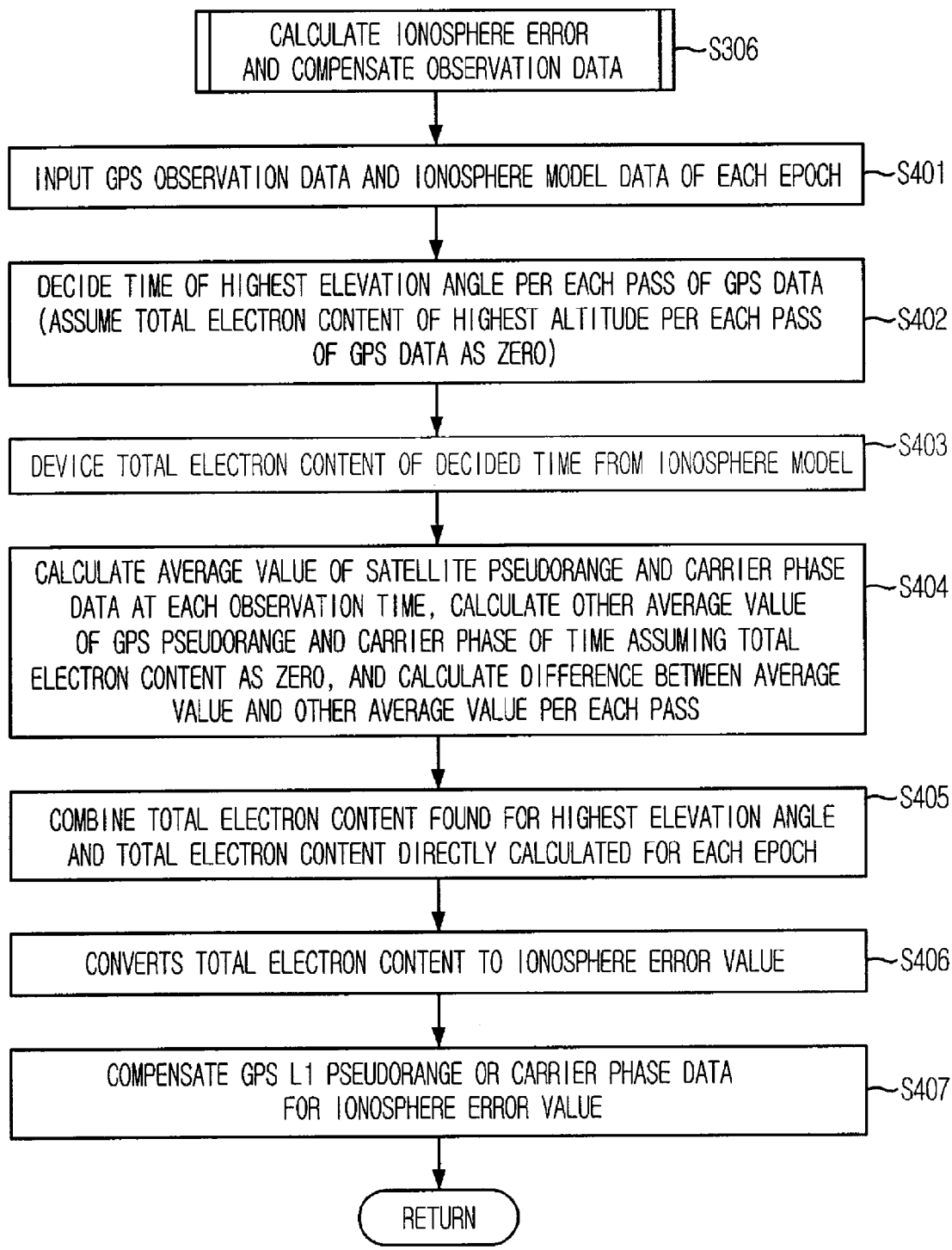
FIG. 4 is a flowchart of correcting an ionosphere error in accordance with a preferred embodiment of the present invention.

FIG. 4 is a flowchart of a method of correcting ionosphere error in accordance with a preferred embodiment of the present invention. That is, operations of the ionosphere error calculating and observation data compensating unit 22 are shown in FIG. 4.

As shown in FIG. 4, GPS data, i.e., carrier phase and pseudorange data, of every observation times and the ionosphere model are inputted at step S401. The GPS data is data received at the LEO satellite or a user using a single frequency. Then, it determines a time of the highest elevation angle of the GPS satellite per one pass of each GPS satellite received at the LEO satellite or the receiver at the ground at step S402.

Then, it determines a minimum value of total electron content at the determined time from the ionosphere model at step S403. That is, it determines the minimum value of total electron content found from the ionosphere model. Herein, the minimum value of total electron content found from the ionosphere model is inaccurate when the elevation angle is low. However, the precision of the ionosphere model is very high because a distance between the GPS satellite and the LEO satellite is short when the elevation angle is high. That is, if the distance between the GPS satellite and the LEO satellite is short then the total electron contents becomes minimized.

The value of total electron content is calculated directly from the GPS data received by a user using a single frequency or by the LEO satellite at step S404. That is, it assumes that the number value of total electron content is zero when the elevation angle is highest. Under such an assumption, a first average value is calculated by averaging GPS pseudorange and carrier phase data at every observation times, and a second average value is calculated by averaging GPS pseudorange and carrier phase data at the time of highest elevation angle. Then, a difference between the first average value and the second average value is obtained, and the value of total electron content of each observation time is determined. Herein, since the integer ambiguity per one pass is identical, the zero assumed ionosphere delay is obtained by a difference of GPS data at two observation times.

Then, the precise value of total electron content is decided by combining the minimum value of total electron content found from the ionosphere model and the value of total electron content directly calculated by assuming the minimum value of total electron content as zero at step S405. The obtained value of total electron content is decided as the ionosphere error value at step S406. That is, it is calculated as a distance value by the ionospheric delay effect.

The pseudorange data is corrected based on the decided ionosphere error value to generate the ionosphere error eliminated GPS pseudorange data at step S407. It is annoying to decide the integer ambiguity for the carrier phase data but the integer ambiguity is not calculated for the pseudorange data although the pseudorange data include great noise. Therefore, it can be processed in high speed.

As descried above, the present invention relates to the method of a precise orbit determination using the GPS pseudorange data when the GPS carrier phase data of the LEO satellite is not available.

As described above, the precise orbit is determined using observation data accurately measured using the GPS L1 frequency data. That is, the precise orbit is determined by performing the filtering on the dual frequency GPS data received at the GPS observation station, the GPS precise ephemeris and the raw data received at the GPS receiver embedded on the on-board of the LEO satellite.

In the present invention, the first average of pseudorange and carrier phase in GPS data observed at every observation times is calculated and the second average of pseudorange and carrier phase in GPS data observed at a time having the minimum value of total electron content (when the elevation angle is highest, or when the distance between the GPS satellite and a receiver is shortest) is calculated. The difference between the first average and the second average is used to determine the precise number of total electron contents. Herein, the ionosphere model created by the international GPS service (IGS) center or other organization can be used to determine realistic observed total electron content value that were assumed by zero-bias. Accordingly, the data precision can be further improved by eliminating the ionosphere delay effect.

Also, it is possible to determine a precise orbit in semi real-time without calculating the integer ambiguity by correcting the pseudorange observation data that causes the ionosphere delay effect. The precise observation data can be obtained by correcting the ionosphere delay effect from the carrier phase data. Also, the ionosphere error removed observation data can be obtained in the data preprocessing step without estimating the parameters using the ionosphere model. Therefore, the present invention can be used in various fields such as a navigation system.

The present application contains subject matter related to Korean patent application No. 2004-0089458, filed in the Korean Intellectual Property Office on Nov. 4, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A system for a precise orbit determination comprising:
   initial orbit determination unit for estimating an initial position of a Global Positioning System (GPS) satellite based on a GPS ephemeris provided from an International Global Navigation Satellite System Services (IGS) site and determining a position of a Low-Earth-Orbit (LEO) satellite based on navigation data of the LEO satellite;
   ionosphere error calculating and correcting unit for correcting an ionosphere error by:
   calculating a first total electron content (TEC) based on a combination of carrier phase data and pseudo range data in single frequency GPS data using a distance difference in time,
   finding a second TEC using an ionosphere model,
   adding the first TEC and the second TEC, and correcting the single frequency GPS data;
   preprocessing unit for double differencing ionosphere-free GPS data received at GPS observation stations and GPS data received at the LEO satellite to generate ionosphere-error-removed-observation-data; and
   orbit determination unit for determining an orbit by applying a GPS observation model the ionosphere-error-removed-observation-data, and estimating a position and a velocity of the LEO satellite through performing a filter algorithm on a difference from the GPS observation model and a dynamic perturbation model.

2. The system as recited in claim 1, wherein the ionosphere error calculating and correcting unit:
   calculates a differences between a first average of pseudo range data and carrier phase data in the single frequency GPS data observed at given point of time,
   calculates a second average of pseudo range data and carrier phase data at a point of time when the single frequency GPS data have highest elevation angle at a given times during the signal phase lock,
   obtains the TEC or ionosphere delay error at the given point of time based on the difference between the first average and the second average,
   finds a minimum TEC or ionosphere delay error using the ionosphere model,
   determines ionosphere error by combining the TEC or ionosphere delay error at the given point of time and the minimum TEC or ionosphere delay error, and
   corrects the pseudo range data or the carrier phase data of the single frequency GPS data based on the determined ionosphere error.

3. A method of correcting an ionosphere error comprising:
   a) determining a point of time when a Global Positioning System (GPS) satellite is a highest elevation angle of a Low-Earth-Orbit (LEO) satellite;
   b) determining a minimum total electron content (TEC) or ionosphere delay error at the point of time when the GPS satellite is a highest elevation angle using an ionosphere model;
   c) determining a TEC or ionosphere delay error at a given point of time using data received from the LEO satellite or using a single frequency GPS data;
   d) determining an ionosphere error value of the single frequency GPS data by combining the minimum TEC or ionosphere delay error and the TEC or ionosphere delay error at the given point of time; and
   e) correcting pseudo range data or carrier phase data of the single frequency GPS data based on the determined ionosphere error value.

4. The method as recited in claim 3, wherein in the step c):
   a first average value of the pseudo range data and the carrier phase data is calculated at the point of time when the GPS satellite is the highest elevation angle at the LEO satellite,
   a second average value of the pseudo range data and the carrier phase data is calculated at the given point of time,
   a distant difference between the first average value and the second average value is obtained, and
   the TEC or ionosphere delay error at the given point of time is determined.

5. A method of a precise orbit determination using a method of correcting an ionosphere error, the method comprising the steps of:
   a) obtaining an initial position of a Global Positioning System (GPS) satellite based on a GPS ephemeris provided from an International Global Navigation Satellite System Services (IGS) site and determining a position of a Low-Earth-Orbit (LEO) satellite based on navigation data of the LEO satellite;
   b) correcting an ionosphere error by:
   calculating a first total electron content (TEC) or ionosphere delay error at the point based on a combination of carrier phase data and pseudo range data in a single frequency GPS data using a distance difference in process of time,
finding a second TEC using an ionosphere model,
adding the first TEC and the second TEC, and
correcting the single frequency GPS data;

c) double differencing ionosphere-free GPS data received at GPS observation stations and GPS data received at the LEO satellite to generate ionosphere-error-removed-observation-data; and d) determining an orbit by applying a GPS observation model the ionosphere-error-removed-observation-data, and estimating a position and a velocity of the LEO satellite through performing a filter algorithm on a difference from the GPS observation model and a dynamic perturbation model.

6. The method as recited in claim 5, wherein the step b) includes the steps of:

b-1) determining a point of time when a Global Positioning System (GPS) satellite is a highest elevation angle per one pass for each GPS satellite received at a LEO satellite or a receiver on a ground;

b-2) determining a minimum TEC or ionosphere delay error at the point of time when the GPS satellite is a highest elevation angle using an ionosphere model;

b-3) determining a TEC or ionosphere delay error at a given point of time using data received using the LEO satellite carrying the single frequency GPS data;

b-4) determining an ionosphere error value of the single frequency GPS data by combining the minimum TEC or ionosphere delay error and the TEC or ionosphere delay error at the given point of time; and b-5) correcting pseudo range data or carrier phase data based on the determined ionosphere error value.

7. The method as recited in claim 5, wherein in the step b-3), a first average value of the pseudo range data and the carrier phase data is calculated at the point of time when the GPS satellite is the highest elevation angle at the LEO satellite, a second average value of the pseudo range data and the carrier phase data is calculated at the given point of time, a distant difference between the first average value and the second average value is obtained, and TEC or ionosphere delay error at the given point of time is determined.

* * * * *